(12) United States Patent
Ohtsu

(10) Patent No.: US 8,270,109 B2
(45) Date of Patent: Sep. 18, 2012

(54) MAGNETIC HEAD SLIDER INHIBITING A SIDE ERASE AND METHOD OF MANUFACTURING THEREOF

(75) Inventor: Takayoshi Ohtsu, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 283 days.

(21) Appl. No.: 12/633,588

(22) Filed: Dec. 8, 2009

(65) Prior Publication Data

US 2010/0157483 A1 Jun. 24, 2010

(30) Foreign Application Priority Data

Dec. 19, 2008 (JP) ................................. 2008-323209

(51) Int. Cl.
*G11B 5/127* (2006.01)
*G11B 5/187* (2006.01)

(52) U.S. Cl. ......... 360/125.03; 360/125.12; 360/125.13; 360/125.14

(58) Field of Classification Search ............. 360/125.09, 360/125.1, 125.11, 125.13, 125.14, 125.15, 360/125.03, 125.12; 260/125.15
See application file for complete search history.

(56) References Cited

U.S. PATENT DOCUMENTS

| | | | |
|---|---|---|---|
| 6,198,597 B1 * | 3/2001 | Tateyama et al. | 360/125.5 |
| 6,952,325 B2 * | 10/2005 | Sato et al. | 360/125.08 |
| 7,639,451 B2 * | 12/2009 | Yatsu et al. | 360/125.09 |
| 7,796,361 B2 * | 9/2010 | Sasaki et al. | 360/125.13 |
| 7,848,053 B2 * | 12/2010 | Mochizuki et al. | 360/125.09 |
| 7,916,425 B2 * | 3/2011 | Sasaki et al. | 360/125.15 |
| 2003/0151850 A1 * | 8/2003 | Nakamura et al. | 360/125 |
| 2005/0162778 A1 * | 7/2005 | Kimura et al. | 360/126 |
| 2006/0221497 A1 * | 10/2006 | Okada et al. | 360/125 |
| 2007/0211382 A1 * | 9/2007 | Mochizuki et al. | 360/126 |

FOREIGN PATENT DOCUMENTS

JP 2006-139848 1/2006

* cited by examiner

*Primary Examiner* — Jefferson Evans
(74) *Attorney, Agent, or Firm* — Zilka-Kotab, PC

(57) ABSTRACT

In one embodiment, a magnetic head slider includes a write head having a single magnetic pole, the single magnetic pole having a main magnetic pole piece that extends to a medium opposing surface facing a magnetic disk. The main magnetic pole piece generates a recording magnetic field from a medium opposing surface side end face thereof being divided into an injection region and a non-injection region. Impurities which deteriorate magnetic properties are present in a higher concentration in the injection region relative to a concentration of the impurities in the non-injection region due to injection of the impurities in the injection region. The non-injection region has a narrower width at a leading end of the medium opposing surface side end face than at a trailing end of the medium opposing surface side end face. In another embodiment, the magnetic head slider may be incorporated into a system including a magnetic recording medium, at least one magnetic head, and a control unit coupled to the magnetic head.

16 Claims, 15 Drawing Sheets

MAGNETIC HEAD SLIDER INHIBITING A SIDE ERASE AND METHOD OF MANUFACTURING THEREOF

RELATED APPLICATIONS

The present application claims priority to a Japanese Patent Application filed Dec. 19, 2008, under Appl. No. 2008-323209, which is incorporated herein by reference.

FIELD OF THE INVENTION

The present invention relates to magnetic recording devices, and specifically to a magnetic head slider which inhibits a side erase on a single magnetic pole type write head.

BACKGROUND OF THE INVENTION

Some conventional technologies, such as those disclosed in Japanese Patent Office (JPO) Pub. No. JP-A-2006-139848, are designed for use with a single magnetic pole type write head that produces perpendicular magnetic recording. This technology prevents an erroneous write on an adjacent track (a so-called "side erase") by forming a medium opposing surface side end face of a main magnetic pole piece, the end face generating a recording magnetic field, into a trapezoidal shape in which the leading end of the end face is narrower than the trailing end.

Meanwhile, because of current trends demanding more and more track density on magnetic recording media, the medium opposing surface side end face of the main magnetic pole piece is reduced in both width and thickness. As a result, the cubic volume of the main magnetic pole piece has decreased, thereby making it difficult to obtain adequate recording magnetic field strength. Particularly if the above-mentioned conventional technology is used, the leading end of the main magnetic pole piece is sharp-pointed, which causes a problem in which a pattern of substantially inverted triangle shape topples when the main magnetic pole piece is termed by using a thin-film formation technique.

Therefore, it would be beneficial to have a magnetic head slider and formation technique which alleviate these problems.

SUMMARY OF THE INVENTION

A magnetic head slider, in one embodiment, includes a write head having a single magnetic pole, the single magnetic pole having a main magnetic pole piece that extends to a medium opposing surface facing a magnetic disk, wherein the main magnetic pole piece generates a recording magnetic field from a medium opposing surface side end face thereof, the medium opposing surface side end face being divided into an injection region and a non-injection region. Impurities which deteriorate magnetic properties are present in a higher concentration in the injection region relative to a concentration of the impurities in the non-injection region due to injection of the impurities in the injection region. The non-injection region has a narrower width at a leading end of the medium opposing surface side end face than at a trailing end of the medium opposing surface side end face.

In another embodiment, a method for manufacturing a magnetic head slider having a single magnetic pole write head comprising forming a thin-film section on a substrate, the thin-film section including a main magnetic pole piece that extends to a medium opposing surface facing a magnetic disk and generates a recording magnetic field from a medium opposing surface side end face. The method also includes cutting the substrate to expose the medium opposing surface side end face, and injecting impurities which deteriorate magnetic properties into the medium opposing surface side end face, wherein impurities are not injected into a non-injection region which has a width which is narrower at a leading end of the medium opposing surface side end face than at a trailing end thereof.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
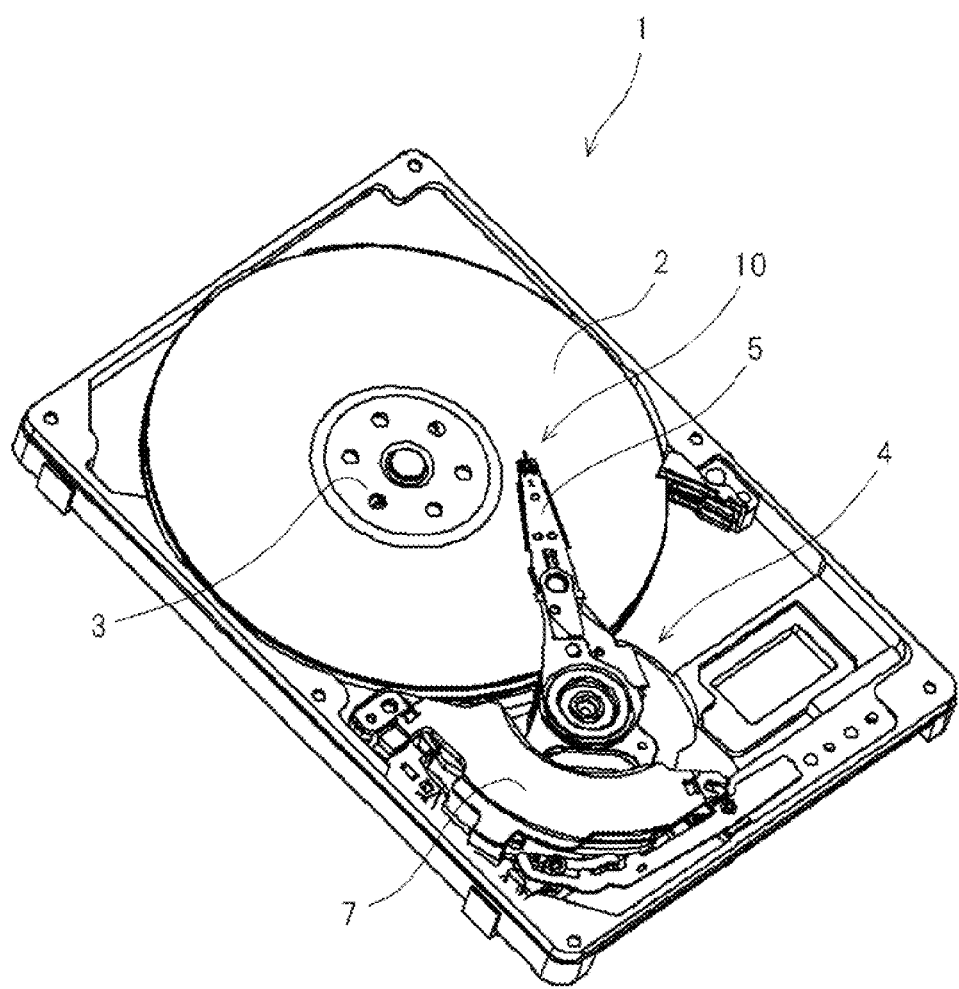
FIG. 1 is a perspective view of a magnetic disk drive according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head slider includes a write head having a single magnetic pole, the single magnetic pole having a main magnetic pole piece that extends to a medium opposing surface facing a magnetic disk, wherein the main magnetic pole piece generates a recording magnetic field from a medium opposing surface side end face thereof, the medium opposing surface side end face being divided into an injection region and a non-injection region. Impurities which deteriorate magnetic properties are present in a higher concentration in the injection region relative to a concentration of the impurities in the non-injection region due to injection of the impurities in the injection region. The non-injection region has a narrower width at a leading end of the medium opposing surface side end face than at a trailing end of the medium opposing surface side end face.

In another general embodiment, a system includes a magnetic recording medium, at least one magnetic head for reading from and/or writing to the magnetic recording medium, a magnetic head slider as recited in claim 1 for supporting the magnetic head, and a control unit coupled to the magnetic head for controlling operation of the magnetic head.

In another general embodiment, a method for manufacturing a magnetic head slider having a single magnetic pole write head includes forming a thin-film section on a substrate, the thin-film section including a main magnetic pole piece that extends to a medium opposing surface facing a magnetic disk and generates a recording magnetic field from a medium opposing surface side end face, cutting the substrate to expose the medium opposing surface side end face, and injecting impurities which deteriorate magnetic properties into the medium opposing surface side end face, wherein impurities are not injected into a non-injection region which has a width which is narrower at a leading end of the medium opposing surface side end face than at a trailing end thereof.

According to some embodiments, the problems described in the background section may be overcome. In one embodiment, a magnetic head slider capable of inhibiting a side erase while maintaining an adequate cubic volume of a main magnetic pole piece is provided. Another embodiment provides a method for manufacturing the magnetic head slider. Still another embodiment provides a system, such as a magnetic disk drive, which has the magnetic head slider that overcomes the problems described above.

According to one embodiment, a magnetic head slider is provided that comprises a single magnetic pole type write head which includes a main magnetic pole piece that is extended to a medium opposing surface facing a magnetic disk and used to generate a recording magnetic field from a medium opposing surface side end face thereof, wherein the medium opposing surface side end face is divided into an injection region into which impurities which deteriorate magnetic properties are injected and a non-injection region into which the impurities are not injected, the non-injection region being shaped to have a narrower width at a leading end of the medium opposing surface side end face than at a trailing end thereof.

According to one embodiment, there is provided the magnetic head slider wherein the width of the non-injection region at the leading end is narrower than that of the medium opposing surface side end face.

In another embodiment, the magnetic head slider includes an end portion of the non-injection region at the leading end which is angular in shape.

In still another embodiment, there is provided a magnetic head slider wherein the end portion of the non-injection region at the leading end is spaced apart from the leading end of the main magnetic pole piece.

In some approaches, there is provided the magnetic head slider wherein the injection depth of the impurities to be injected from the injection region into the main magnetic pole piece decreases with closing to the leading end portion of the non-injection region from the leading end of the main magnetic pole piece.

In more approaches, there is provided the magnetic head slider wherein the width of the non-injection region at the trailing end is narrower than that of the medium opposing surface side end face.

According to another embodiment, there is provided the magnetic head slider wherein the main magnetic pole piece includes a rod-shaped section which is extended to the medium opposing surface and provided at the tip end with the medium opposing surface side end face, and a wide section which is connected to the base end of the rod-shaped section and wider than the rod-shaped section, and wherein the impurities are injected into part of the rod-shaped section.

And in another embodiment, there is provided the magnetic head slider wherein the injection depth of the impurities to be injected from the injection region into the main magnetic pole piece decreases with closing to an outer edge of the non-injection region.

In more embodiments, there is provided the magnetic head slider wherein the concentration of the impurities to be injected from the injection region into the main magnetic pole piece is higher at a portion nearer to the medium opposing surface side end face. Additionally, there is provided the magnetic head slider wherein the end portion of the non-injection region at the trailing end is divided widthwise with the injection region formed between the resulting divisions.

According to one embodiment, there is provided the magnetic head slider wherein the main magnetic pole piece includes a shield layer which is positioned at a predetermined distance from the medium opposing surface side end face, the shield layer inhibiting the passage of the impurities. In addition, there is provided the magnetic head slider wherein the distance between the shield layer and the medium opposing surface side end face decreases with closing to the trailing end of the main magnetic pole piece.

Furthermore, in some embodiments, there is provided a magnetic head slider wherein the main magnetic pole piece includes a first portion which is on the same side as the medium opposing surface side end face with respect to the shield layer, and a second portion which is on the side opposite to the medium opposing surface side end face with respect to the shield layer, the second portion being thicker than the first portion.

According to some embodiments, there is provided a magnetic disk drive including the magnetic head slider as described above.

Also, in some approaches, there is provided a method for manufacturing a magnetic head slider having a single magnetic pole type write head which includes a main magnetic pole piece that is extended to a medium opposing surface facing a magnetic disk and used to generate a recording magnetic field from a medium opposing surface side end face, the method comprising the steps of: forming a thin-film section which includes the main magnetic pole piece, on a substrate; cutting the substrate on which the thin-film section is formed, in such a manner as to expose the medium opposing surface side end face; and injecting impurities deteriorating magnetic properties into the medium opposing surface side end face, such that a non-injection region into which the impurities are not injected is shaped to have a narrower width at a leading end of the medium opposing surface side end face than at a trailing end thereof.

According to some approaches, the non-injection region of the medium opposing surface side end face of the main magnetic pole piece is firmed so that the leading end is narrower than the trailing end. This makes it possible to inhibit a side erase while maintaining an adequate cubic volume of the main magnetic pole piece.

Now referring to FIG. 1, a perspective view of a magnetic disk drive 1, according to one embodiment, is shown. In this figure, a top cover is not shown. A magnetic disk 2 and a head assembly 4 are placed within a housing for the magnetic disk drive 1. The magnetic disk 2 is mounted on a spindle motor 3 which is placed at the bottom of the housing. The head assembly 4 is rotatably supported at a position adjacent to the magnetic disk 2. A suspension arm 5 is mounted at the leading end of the head assembly 4. A magnetic head slider 10 is supported by the leading end of the suspension arm 5. A voice coil motor 7 is mounted at the trailing end of the head assembly 4. The voice coil motor 7 moves the magnetic head slider 10 in a substantially radial direction over the magnetic disk 2 by rotatably driving the head assembly 4.

Figure 2:
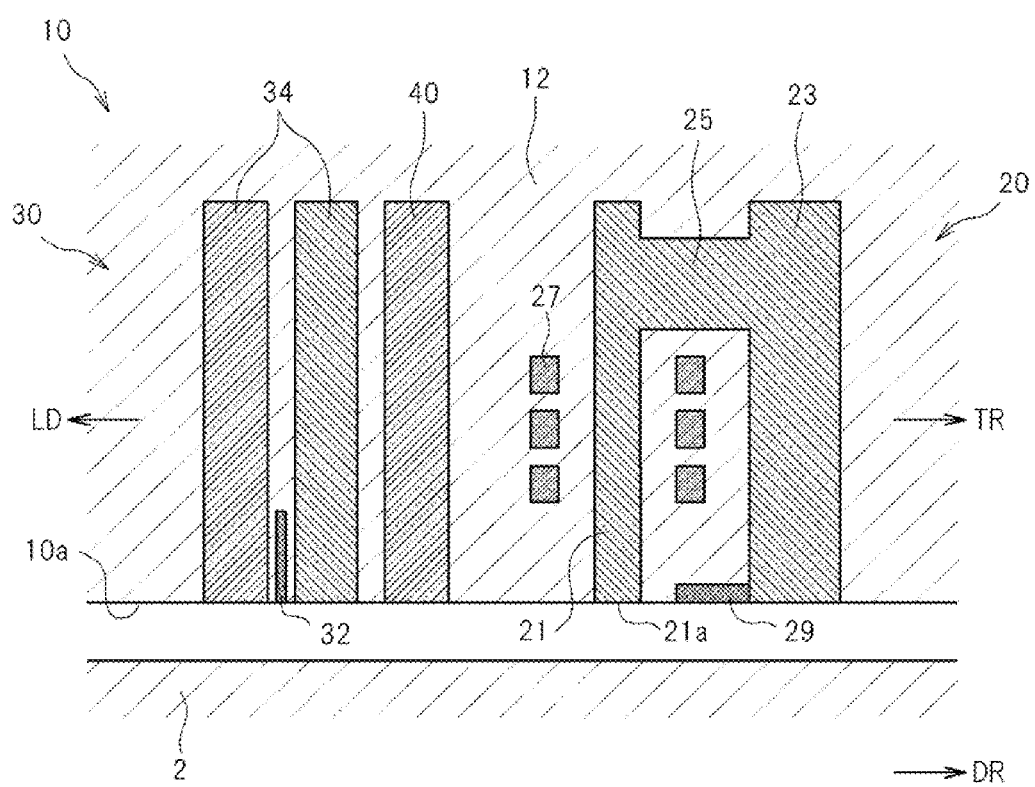
FIG. 2 is a cross-sectional view of an essential part of a magnetic head slider according to one embodiment.

FIG. 2 is a cross-sectional view of one part of the magnetic head slider 10, according to one embodiment. In FIG. 2, arrow DR indicates the rotation direction of the magnetic disk 2; arrow TR, the trailing direction of the magnetic head slider 10; and arrow LD, the leading direction of the magnetic head slider 10. An air bearing surface (ABS) is formed on a medium opposing surface 10a of the magnetic head slider 10, the medium opposing surface 10a facing the magnetic disk 2. The magnetic head slider 10 receives a gaseous stream produced by the rotation of the magnetic disk 2 and flies above the magnetic disk 2. The magnetic head slider 10 includes a write head 20 and a read head 30 which are positioned within a thin-film section 12 formed on a substrate.

The write head 20 is a single magnetic pole type write head that achieves perpendicular magnetic recording. The write head 20 includes a main magnetic pole piece 21, an auxiliary magnetic pole piece 23, and a joint 25 which are made of a soft magnetic material such as Permalloy and magnetically connected. The main magnetic pole piece 21 is extended to the medium opposing surface 10a, and excited by a coil 27 to generate a recording magnetic field from a medium opposing surface side end face 21a. The recording magnetic field generated from the medium opposing surface side end face 21a is reflexed within the magnetic disk 2 and absorbed by the auxiliary magnetic pole piece 23. A magnetic shield 29 is provided around the medium opposing surface side end face 21a of the main magnetic pole piece 21.

The read head 30 is provided on the leading side of the write head 20 with a magnetic shield 40 positioned between the read head 30 and the write head 20. The read head 30 includes a read element 32 which is made of a magnetoresistive element, and a pair of magnetic shields 34. The read element 32 is positioned between the pair of magnetic shields 34.

Figure 3:
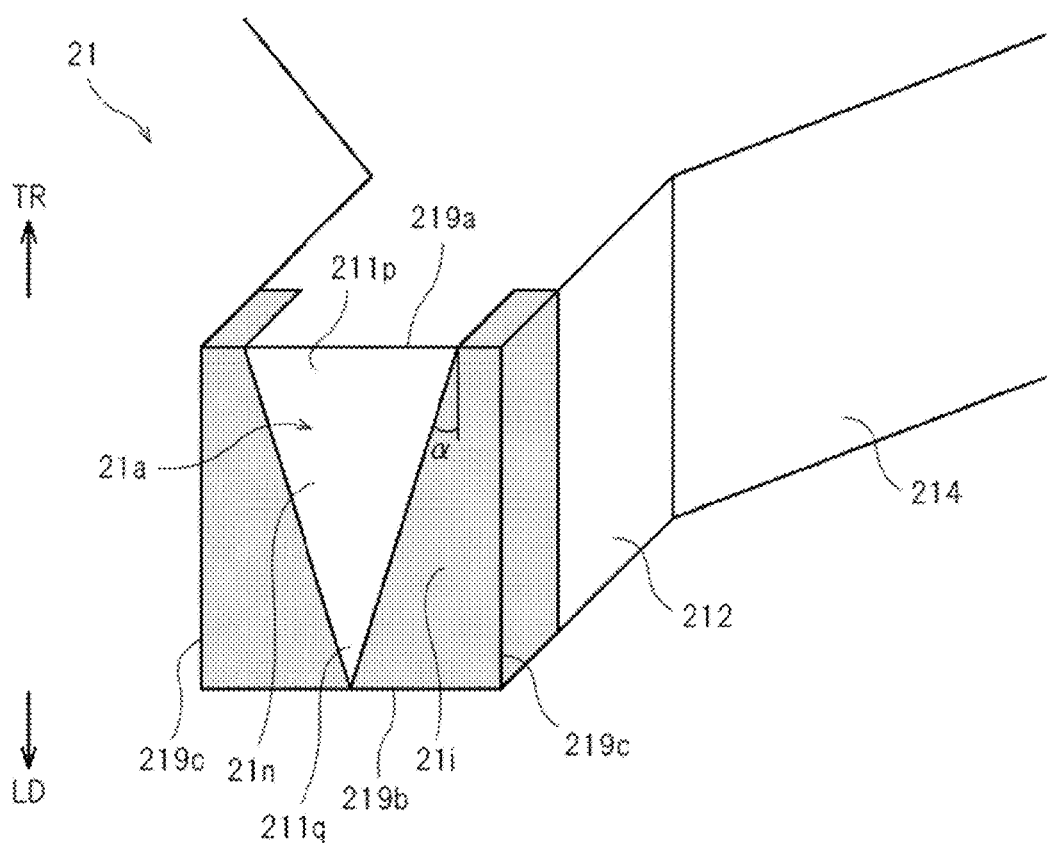
FIG. 3 is a perspective view illustrating one aspect of a main magnetic pole piece of the magnetic head slider, according to one embodiment.

FIG. 3 is a perspective view illustrating one embodiment of the main magnetic pole piece 21. In FIG. 3, the direction along ends 219a and 219b of the main magnetic pole piece 21 (the horizontal direction in the figure) is the direction of the width, whereas the direction along ends 219c of the main magnetic pole piece (the vertical direction in the figure) is the direction of the thickness. The main magnetic pole piece 21 includes a rod-shaped section 212 which is provided at its leading end with a medium opposing surface side end face 21a having a rectangular shape, and a wide section 214 which is extended widthwise from the base end of the rod-shaped section 212.

The medium opposing surface side end face 21a of the main magnetic pole piece 21 has a portion into which ions acting as impurities which deteriorate magnetic properties are injected to a predetermined depth. Therefore, the medium opposing surface side end face 21a of the main magnetic pole piece 21 is divided into a nonmagnetic injection region 21i into which the ions are injected, and a ferromagnetic non-injection region 21n into which the ions are not injected. A recording magnetic field is generated from the non-injection region 21n.

The non-injection region 21n is formed at the widthwise center of the medium opposing surface side end face 21a of the main magnetic pole piece 21. The injection region 21i is formed on both widthwise sides of the non-injection region 21n. The boundaries between the non-injection region 21n and injection region 21i are extended from the trailing end 219a of the main magnetic pole piece 21 to the leading end 219b. The boundaries gradually come closer to the widthwise center with closing to a side of the leading end, and join with each other at the leading end 219b. The angle α formed by straight lines along the direction of the thickness and the boundary between the non-injection region 21n and injection region 21i is referred to as the bevel angle.

Consequently, the width of the non-injection region 21n gradually decreases with closing to the side of the leading end from a side of the trailing end. Thus, a leading end portion 211q is narrower than a trailing end portion 211p. As described above, the non-injection region 21n has triangular shape with an angular leading end portion 211q. On the other hand, the width of the injection region 21i gradually increases with closing to the side of the leading end from the side of the trailing end.

Figure 4:
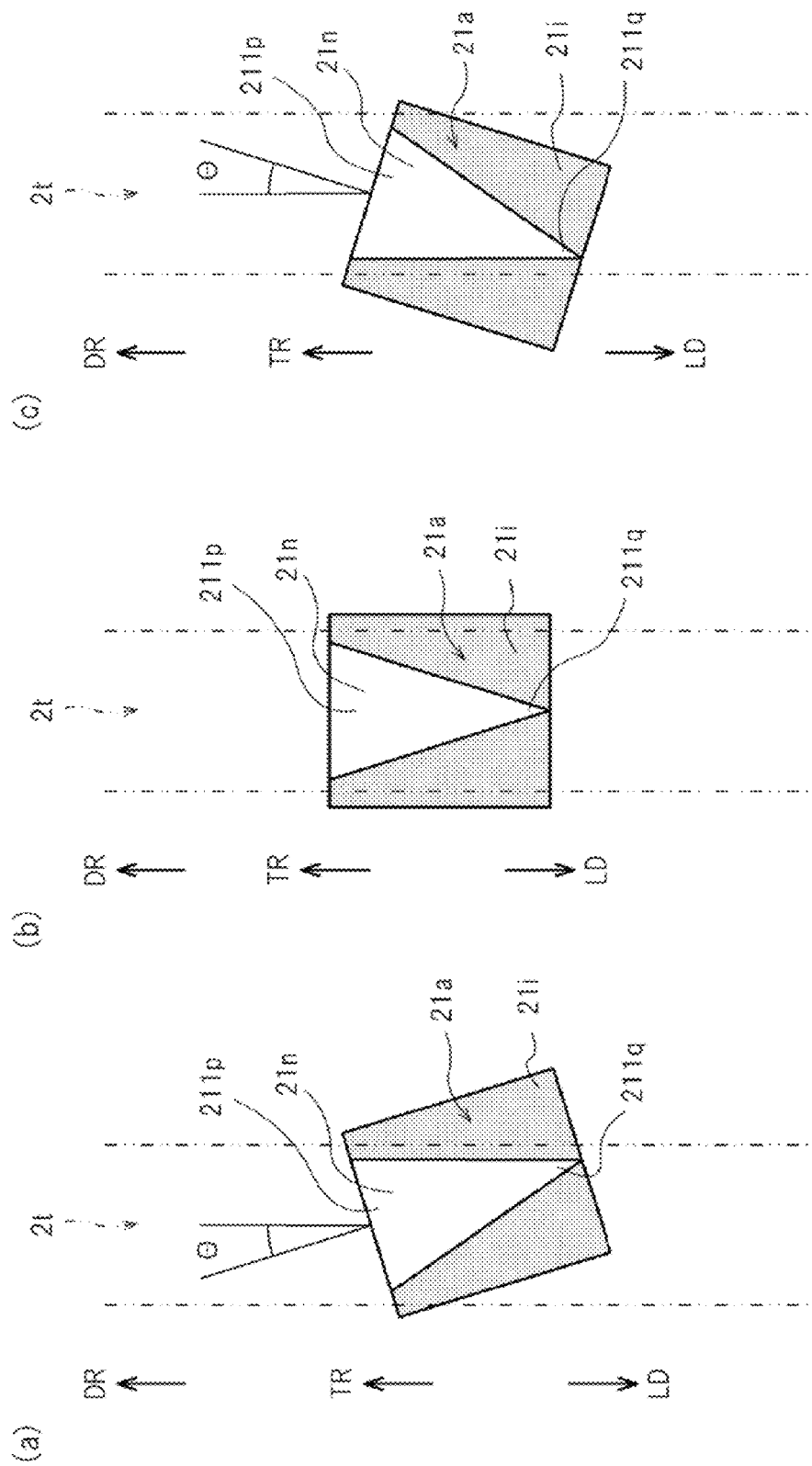
FIGS. 4(a) to 4(c) are diagrams illustrating the advantages provided by the above aspect, according to one embodiment.

As a result, even when the medium opposing surface side end face 21a of the main magnetic pole piece 21 is tilted from a track 2t of the magnetic disk 2 to form a skew angle θ as shown in FIGS. 4(a) to 4(c), the non-injection region 21n is positioned within the width of the track 2t, thereby inhibiting an erroneous write (side erase) on an adjacent track. The bevel angle α is set to be substantially equal to the maximum skew angle θ. It should be noted that the recording magnetic field generated from the non-injection region 21n is relatively strong at the trailing end portion 211p. Therefore, even if the leading end portion 211q of the non-injection region 21n has a limited width, an adequate recording magnetic field can be obtained.

Further, since the medium opposing surface side end face 21a of the main magnetic pole piece 21 has a part into which ions are injected, the shape and size of the region from which a recording magnetic field is generated (that is, the non-injection region 21n) are controlled. Therefore, an adequate cubic volume of the main magnetic pole piece 21 is obtained to provide adequate recording magnetic field strength. Furthermore, the leading end of the main magnetic pole piece 21 need not be sharp-pointed. This makes it possible to avoid a problem in which, for example, a pattern topples when the main magnetic pole piece 21 is to be formed by using a thin-film formation technique.

In addition, the trailing end portion 211p of the non-injection region 21n is narrower than the medium opposing surface side end face 21a of the main magnetic pole piece 21 and positioned apart from both widthwise ends 219c. The width of the trailing end portion 211p of the non-injection region 21n is determined in accordance with the width of the track 2t (see FIGS. 4(a) to 4(c)). On the other hand, the width of the medium opposing surface side end face 21a of the main magnetic pole piece 21 is not limited by the width of the track 2t. Therefore, the medium opposing surface side end face 21a of the main magnetic pole piece 21 can be made wider than the track 2t. Consequently, an adequate cubic volume of the main magnetic pole piece 21 can be obtained to provide adequate recording magnetic field strength.

It is preferred that the ions to be injected from the injection region 21i to the main magnetic pole piece 21 be injected to a depth of, for instance, at least 35 nm from the medium opposing surface side end face 21a. Cr or other metal ions or Ar or other gas ions may be used as the ions to be injected. When Cr or other metal ions are used, they deteriorate the magnetic properties of the main magnetic pole piece 21 with relatively high efficiency. When Ar or other gas ions are used, ionization can be achieved with relative ease. It is also preferred that ions deteriorating the corrosion resistance of the main magnetic pole piece 21 not be used as the ions to be injected.

Figure 5A:
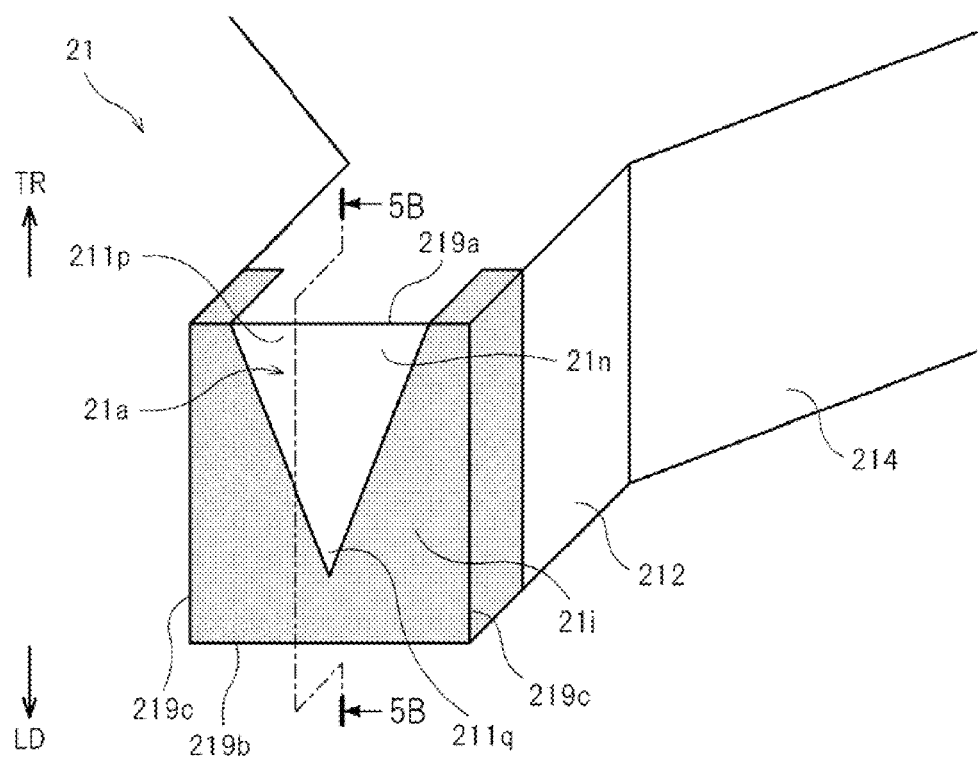
FIG. 5A is a perspective view illustrating another aspect of the main magnetic pole piece, according to one embodiment.
Figure 5B:
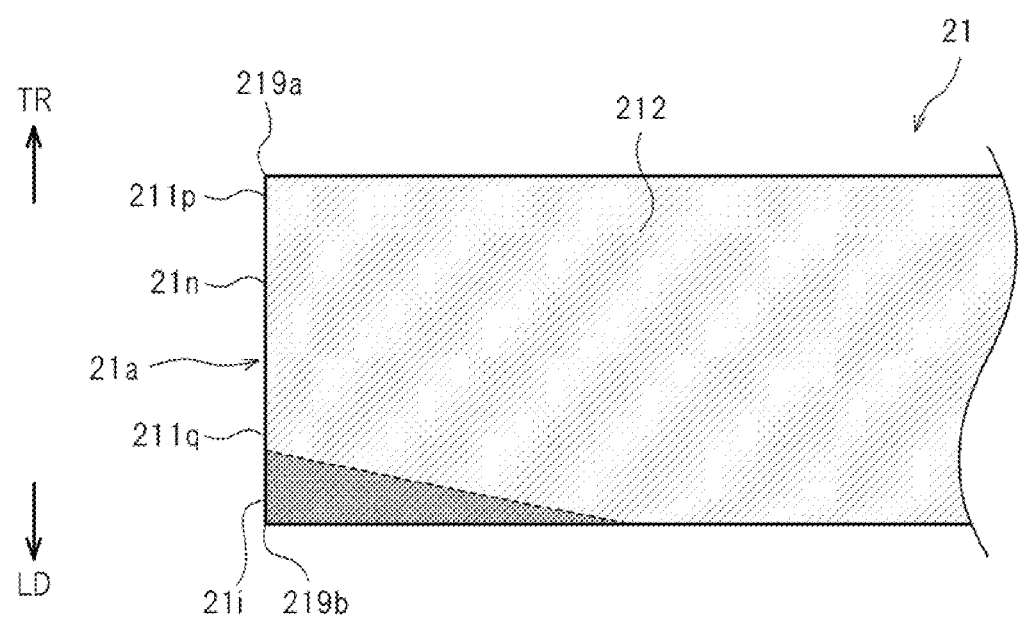
FIG. 5B is a cross-sectional view illustrating the above aspect, according to one embodiment.

FIGS. 5A and 5B are a perspective view and a cross-sectional view, respectively, which illustrate another embodiment of a portion of the main magnetic pole piece 21. Elements identical with those of the aspect described earlier are designated by the same reference numerals as the corresponding elements and will not be redundantly detailed. In the present aspect, the leading end portion 211q of the non-injection region 21n is spaced apart from the leading end 219b of the main magnetic pole piece 21.

The thickness of the non-injection region 21n is determined from the viewpoint of side erase inhibition. More specifically, the width of the trailing end portion 211p of the non-injection region 21n decreases with a decrease in the width of the track 2t. This makes it necessary to reduce the thickness of the non-injection region 21n. However, no such limitation is imposed on the thickness of the medium opposing surface side end face 21a of the main magnetic pole piece 21. Therefore, the medium opposing surface side end face 21a of the main magnetic pole piece 21 can be made thicker than the non-injection region 21. Consequently, an adequate cubic volume of the main magnetic pole piece 21 can be obtained to provide adequate recording magnetic field strength.

As shown in FIG. 5B, the injection depth of ions to be injected from the injection region 21i into the main magnetic pole piece 21 decreases with closing to the side of the leading end portion 211q of the non-injection region 21n from the side of the leading end 219b of the main magnetic pole piece 21, in one approach. This makes a magnetic path formed in the main magnetic pole piece 21 gradually narrow toward the medium opposing surface side end face 21a of the main magnetic pole piece 21. Therefore, the recording magnetic field produced in the main magnetic pole piece 21 is smoothly concentrated toward the non-injection region 21n. It should be noted that the ion injection depth is not limited to the above-described one and may alternatively vary in a staircase or curved pattern.

Figure 6A:
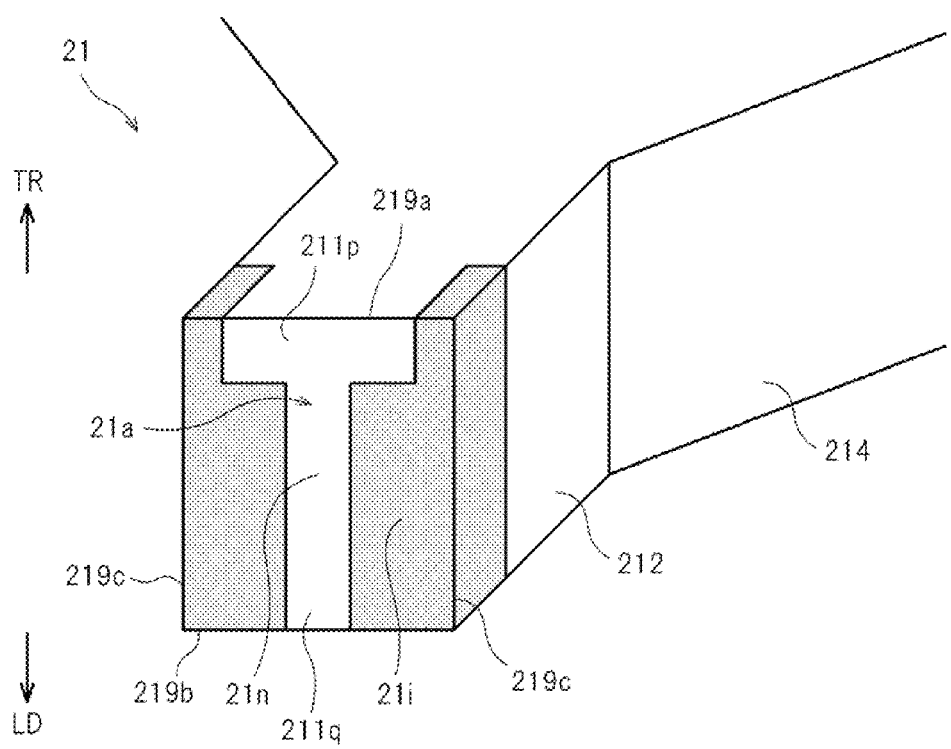
FIG. 6A is a perspective view illustrating another aspect of the main magnetic pole piece, according to one embodiment.
Figure 6B:
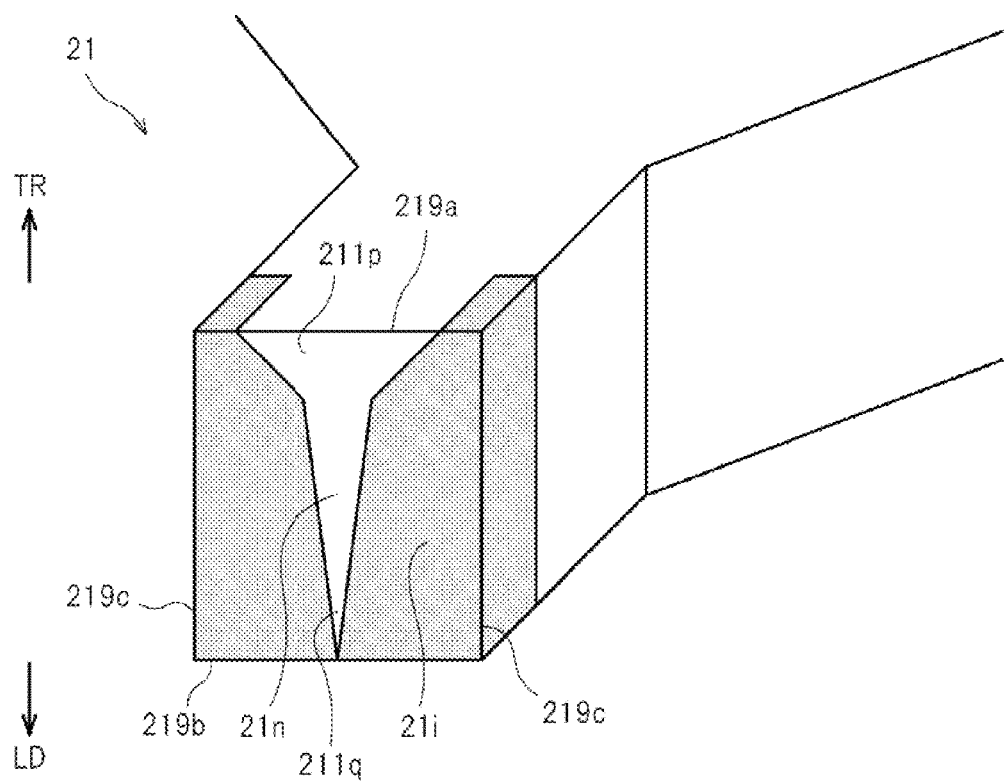
FIG. 6B is a perspective view illustrating another aspect of the main magnetic pole piece, according to one embodiment.

FIGS. 6A and 6B are perspective views illustrating other embodiments of the main magnetic pole piece 21. Elements identical with those of the aspects described earlier are designated by the same reference numerals as the corresponding elements and will not be redundantly detailed. As shown in FIGS. 6A and 6B, the non-injection region 21n may be substantially shaped like the letter T. According to these aspects, the trailing end portion 211p of the non-injection region 21n, where recording magnetic field strength is relatively high, is adequately wide while the width of the other portion is further reduced. This makes it possible to further inhibit a side erase. It is very difficult to form the main magnetic pole piece end face into substantially T-shape by means, for instance, of etching. However, the present aspects, which provide ion injection, make it easy to substantially shape a region where a recording magnetic field is generated, that is, the non-injection region 21n, like the letter T.

Figure 7:
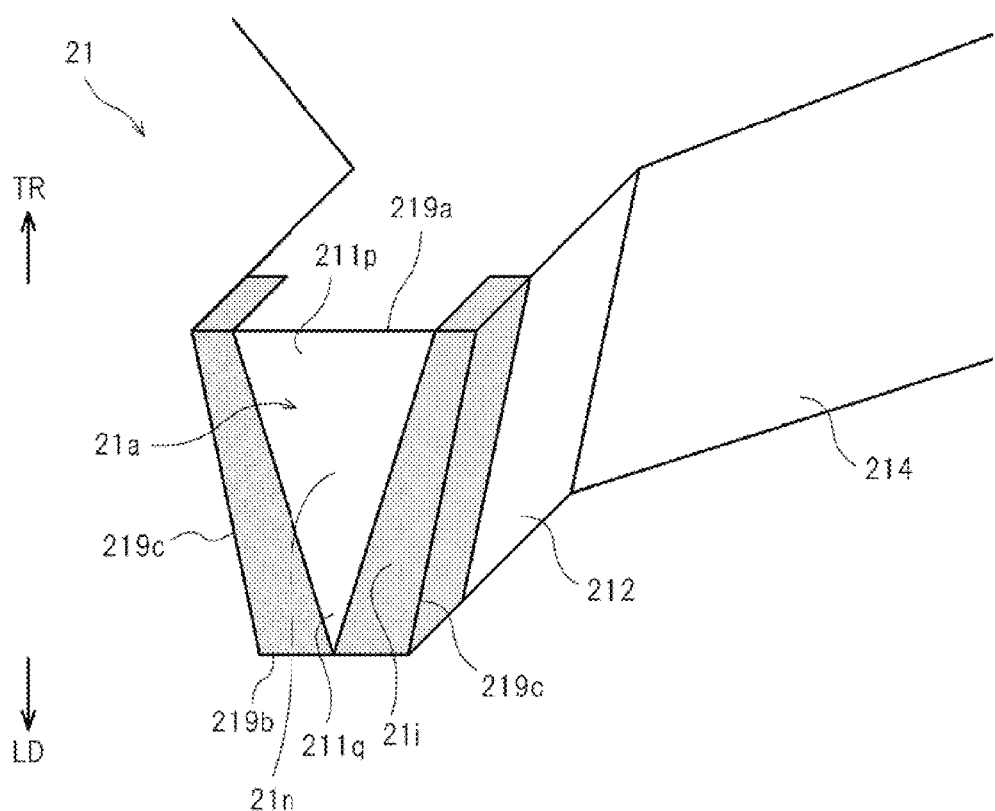
FIG. 7 is a perspective view illustrating another aspect of the main magnetic pole piece, according to one embodiment.

FIG. 7 is a perspective view illustrating another embodiment of the main magnetic pole piece 21. Elements identical with those of the aspects described earlier are designated by the same reference numerals as the corresponding elements and will not be redundantly detailed. As shown in FIG. 7, the medium opposing surface side end face 21a of the main magnetic pole piece 21 is shaped like a trapezoid with the leading end 219b made narrower than the trailing end 219a. Even in this aspect, the aforementioned side erase inhibition effect is produced because the leading end portion 211q of the non-injection region 21n is narrower than the leading end 219b of the main magnetic pole piece 21 and positioned apart from both widthwise ends 219c. In addition, the leading end of the main magnetic pole piece 21 need not be sharp-pointed. This makes it possible to avoid a problem in which, for example, a pattern of substantially inverted triangle shape topples when the main magnetic pole piece 21 is to be formed by using a thin-film formation technique.

Figure 8A:
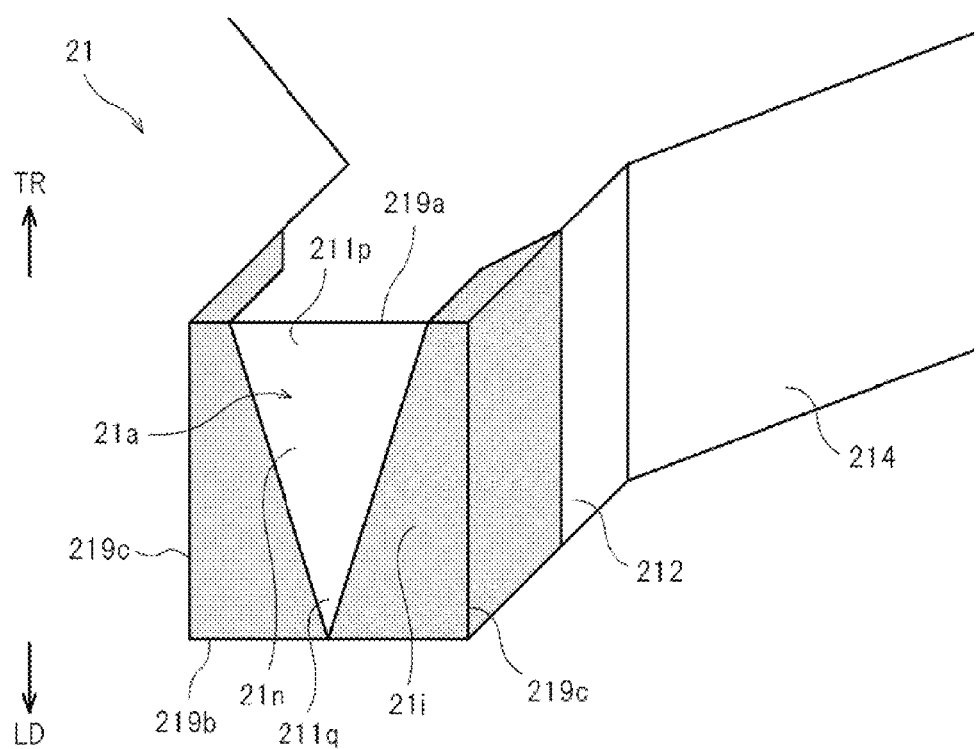
FIG. 8A is a perspective view illustrating another aspect of the main magnetic pole piece, according to one embodiment.
Figure 8B:
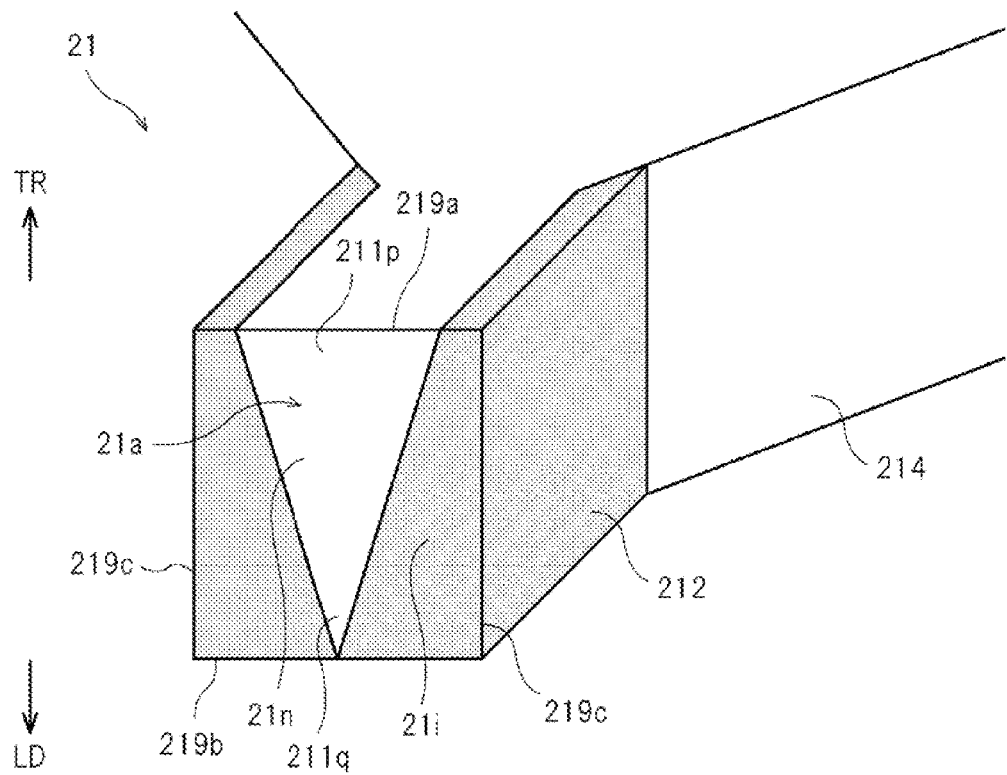
FIG. 8B is a perspective view illustrating another aspect of the main magnetic pole piece, according to one embodiment.

FIGS. 8A and 8B are perspective views illustrating other embodiments of the main magnetic pole piece 21. Elements identical with those of the aspects described earlier are designated by the same reference numerals as the corresponding elements and will not be redundantly detailed. In these aspects, the injection depth of ions to be injected from the injection region 21i into the main magnetic pole piece 21 decreases with closing to the boundary between the non-injection region 21n and injection region 21i (the outer edge of the non-injection region 21n). This makes the magnetic path formed in the main magnetic pole piece 21 gradually narrow toward the medium opposing surface side end face 21a of the main magnetic pole piece 21. Therefore, the recording magnetic field produced in the main magnetic pole piece 21 is smoothly concentrated toward the non-injection region 21n. It should be noted that the ion injection depth is not limited to the above-described one and may alternatively vary in a staircase or curved pattern.

Further, as shown in FIG. 8B, an alternative would be to set the ion injection depth to a level close to the boundary between the rod-shaped section 212 and wide section 214 and to incline the ion injection depth to match the inclination of the wide section 214. This alternative causes the magnetic path, which is abruptly narrowed from the wide section 214 to the rod-shaped section 212, to be smooth shape.

Figure 9:
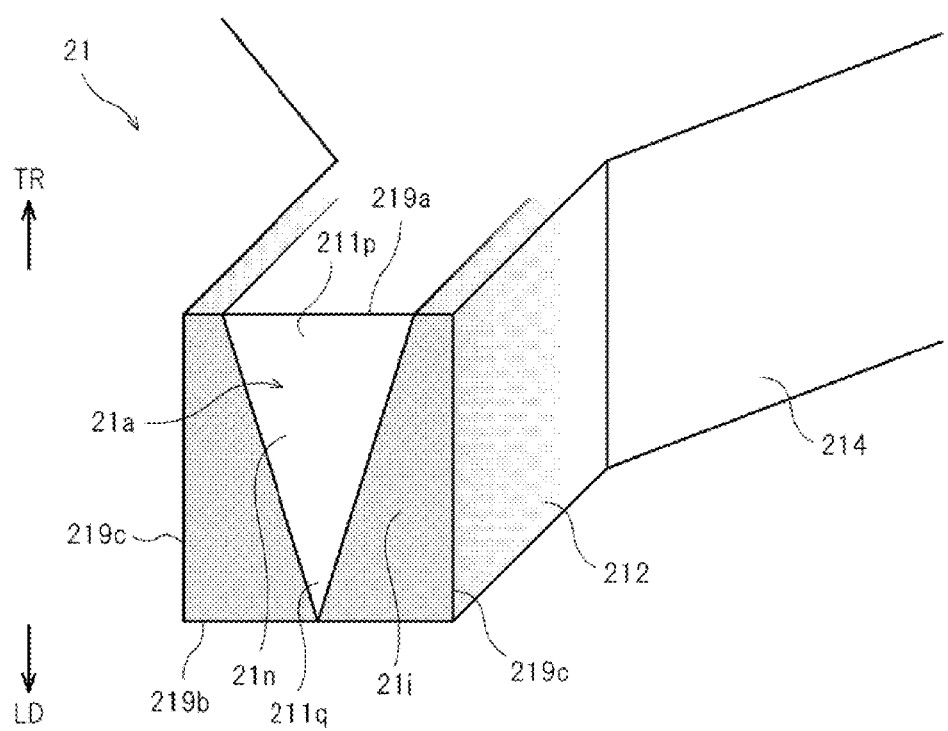
FIG. 9 is a perspective view illustrating another aspect of the main magnetic pole piece, according to one embodiment.

FIG. 9 is a perspective view illustrating another embodiment of the main magnetic pole piece 21. Elements identical with those of the aspects described earlier are designated by the same reference numerals as the corresponding elements and will not be redundantly detailed. In this aspect, the concentration of ions to be injected from the injection region 21i to the main magnetic pole piece 21 is higher at a portion nearer to the medium opposing surface side end face 21a of the main magnetic pole piece 21. Such a concentration characteristic is achieved when an increased number of relatively low energy ions are injected while a decreased number of relatively high energy ions are injected. This provides the same advantages as the aspects described with reference to FIGS. 8A and 8B. More specifically, the magnetic path formed in the main magnetic pole piece 21 gradually narrows toward the medium opposing surface side end face 21a of the main magnetic pole piece 21. Therefore, the recording magnetic field produced in the main magnetic pole piece 21 is smoothly concentrated toward the non-injection region 21n.

Figure 10:
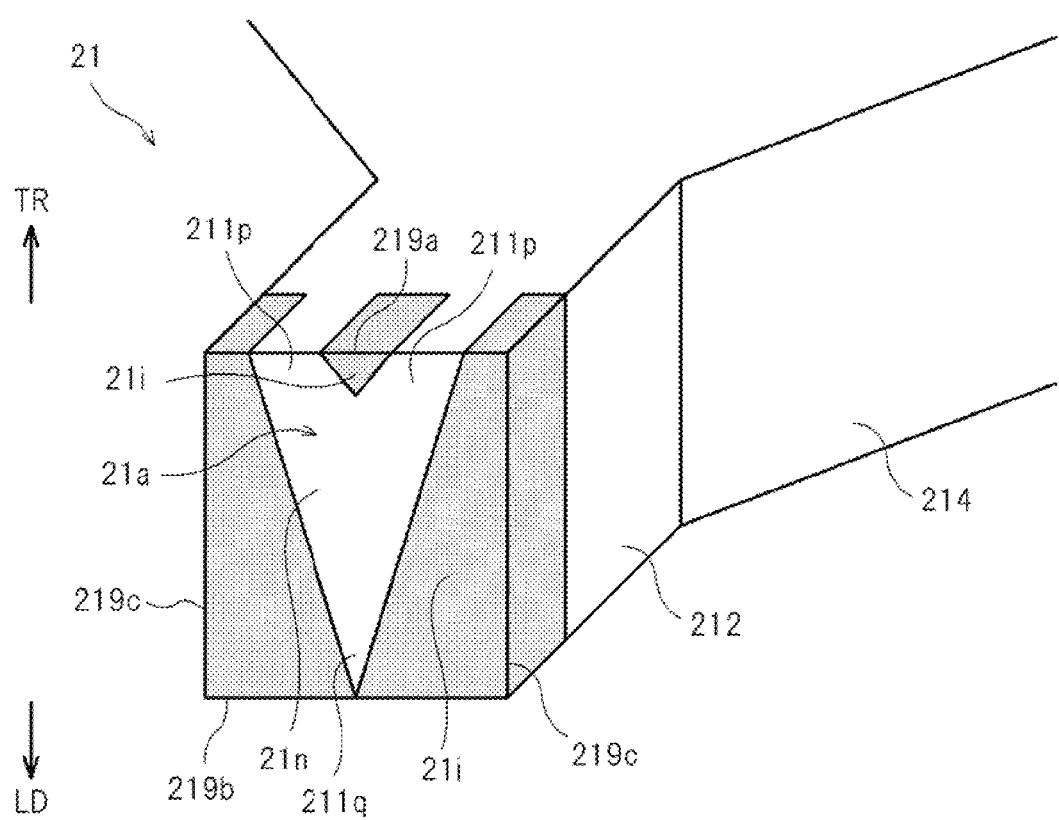
FIG. 10 is a perspective view illustrating another aspect of the main magnetic pole piece, according to one embodiment.

FIG. 10 is a perspective view illustrating another embodiment of the main magnetic pole piece 21. Elements identical with those of the aspects described earlier are designated by the same reference numerals as the corresponding elements and will not be redundantly detailed. In this aspect, the injection region 21i is additionally formed at the center of the trailing end portion 211p of the non-injection region 21n. In other words, the trailing end portion 211p is divided widthwise with the injection region 21i formed between the resulting divisions. This makes the non-injection region 21n be formed at the center of the trailing end portion 211p of the non-injection region 21n, where the recording magnetic field strength is likely to increase. Therefore, the strength of the recording magnetic field generated from the non-injection region 21n is uniformly distributed in the direction of the width.

Figure 11A:
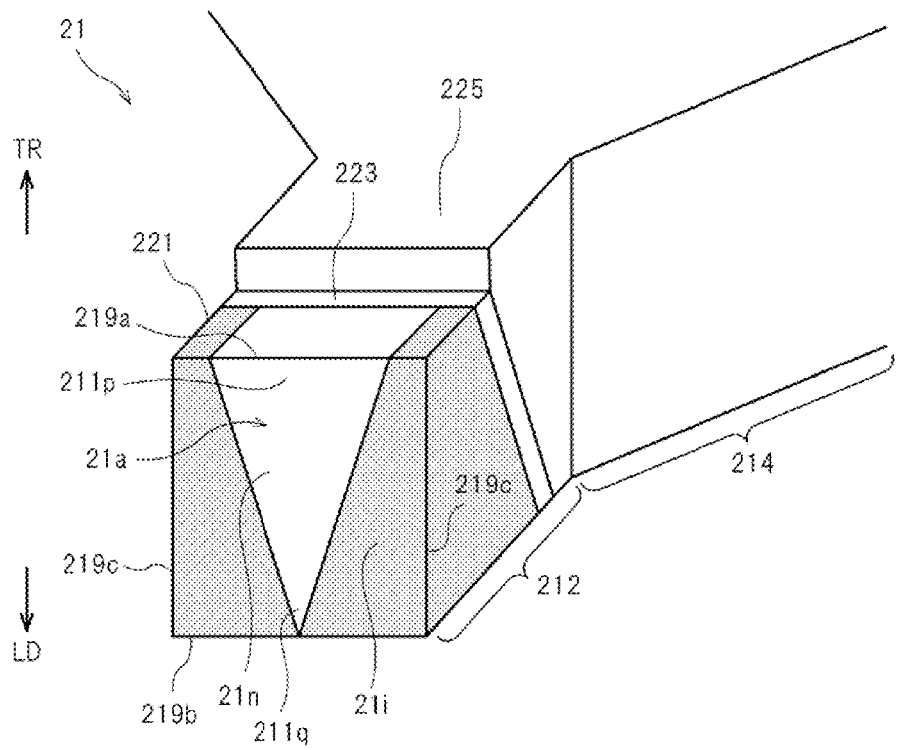
FIG. 11A is a perspective view illustrating another aspect of the main magnetic pole piece, according to one embodiment.
Figure 11B:
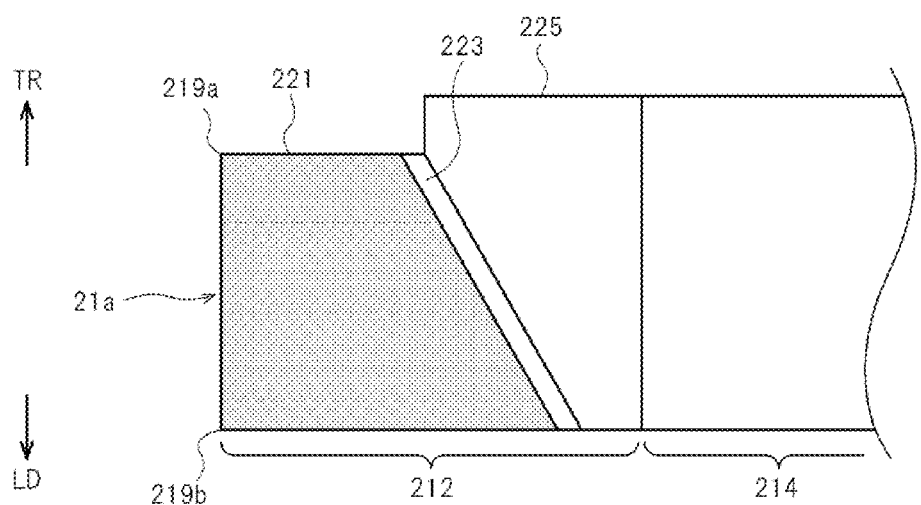
FIG. 11B is a side view illustrating the above aspect, according to one embodiment.

FIGS. 11A and 11B are a perspective view and a side view, respectively, which illustrate other embodiments of the main magnetic pole piece 21. Elements identical with those of the aspect described earlier are designated by the same reference numerals as the corresponding elements and will not be redundantly detailed. In this aspect, the main magnetic pole piece 21 includes a shield layer 223 which is positioned at a predetermined distance from the medium opposing surface side end face 21a in order to inhibit the passage of the ions. The main magnetic pole piece 21 can be divided into a first portion 221 and a second portion 225. The first portion 221 is provided on the same side as the medium opposing surface side end face 21a with respect to the shield layer 223. The second portion 225 is provided on the side opposite the medium opposing surface side end face 21a with respect to the shield layer 223. The thickness of the shield layer 223 is set so as to maintain a magnetic connection between the first portion 221 and the second portion 225.

The distance between the shield layer 223 and the medium opposing surface side end face 21a decreases with closing to the side of the trailing end 219a of the main magnetic pole piece 21. Therefore, the injection depth of ions to be injected from the injection region 21i into the main magnetic pole piece 21 decreases with closing to the side of the trailing end 219a of the main magnetic pole piece 21. Thus, the recording magnetic field generated in the main magnetic pole piece 21 is more likely to be concentrated at the trailing end portion 211p of the non-injection region 21n. This results in an increase in the strength of the recording magnetic field generated from the trailing end portion 211p of the non-injection region 21n.

The main magnetic pole piece 21 may be manufactured firstly by forming the first portion 221, secondly by forming the shield layer 223, and thirdly by forming the second portion 225. As the first portion 221 and the second portion 225 are formed on an individual basis, their thicknesses can be made different from each other. In the present aspect, the second portion 225 is thicker than the first portion 221. Consequently, an adequate cubic volume of the main magnetic pole piece 21 can be obtained to provide adequate recording magnetic field strength.

The shield layer 223 is made of a material that is heavier than the ions to be injected from the injection region 21i into the first portion 221. More specifically, the shield layer 223 may be comprised, for instance, of Ti, Cr, Cu, Nb, Mo, Ku, Rh, Pd, Hf, Ta, W, Re, Os, Ir, Pt, and Au or a combination of two or more of them.

Figure 12A:
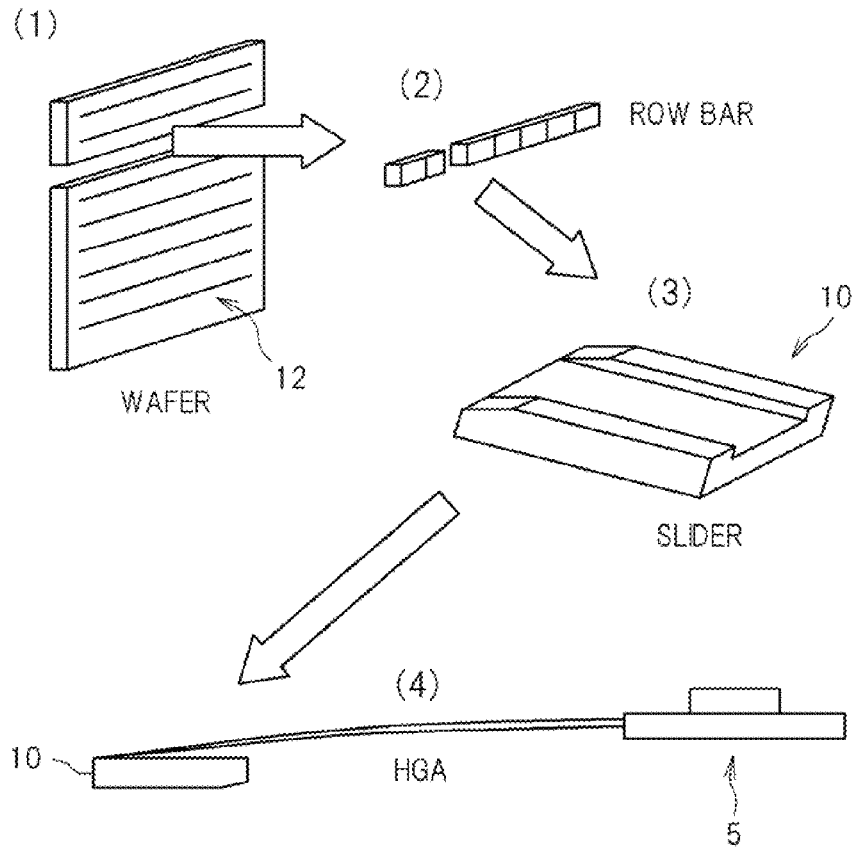
FIG. 12A illustrates a method for manufacturing the magnetic head slider according to one embodiment.

FIG. 12A illustrates a method for manufacturing the magnetic head slider 10 according to one approach. The magnetic head slider 10 may be manufactured by performing (1) a wafer process, (2) a row bar process, and (3) a slider process. Subsequently, (4) an HGA process may be performed to obtain a head gimbal assembly (HGA) by bonding the magnetic head slider 10 to the suspension arm 5.

In (1) the wafer process, the thin-film section 12 which includes the aforementioned write head 20 and read head 30 is formed on a substrate. In (2) the row bar process, the substrate on which the thin-film section 12 is formed is cut to obtain a row bar. In this instance, the thin-film section 12 is cut in such a manner as to expose the medium opposing surface side end face 21a of the main magnetic pole piece 21.

Figure 12B:
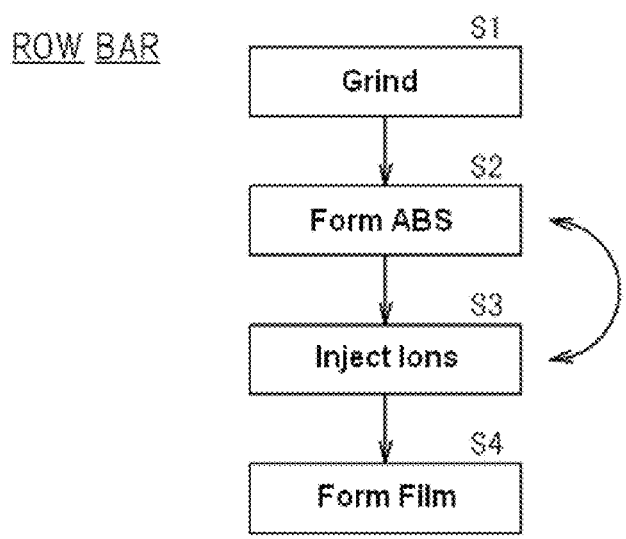
FIG. 12B is a flowchart illustrating the details of a part of the above manufacturing method, according to one embodiment.

In (2) the row bar process, processing steps S1 to S4 are also performed as shown in FIG. 12B, in one approach. In a grinding step (step S1), the row bar is ground until the main magnetic pole piece 21 is shaped to a predetermined length. In an ABS formation step (step S2), an air bearing surface (ABS) is formed on the ground row bar by means, for instance, of ion milling or etching. In an ion injection step (step S3), ions are injected into a part of the medium opposing surface side end face 21a of the main magnetic pole piece 21 to form the injection region 21i and non-injection region 21n. This ion injection step is performed by using a publicly known ion injection device. In a film formation step (step S4), a protective film is formed on the air bearing surface which is formed on the row bar. It should be noted that the ABS forming step (step S2) may alternatively be performed immediately after the ion injection step (step S3).

Subsequently, (3) the slider process is performed to obtain the magnetic head slider 10 by cutting the row bar.

While the present invention has been described in terms of a preferred embodiment, persons of skill in the art will appreciate that the invention is not limited to the above-described preferred embodiment, and that variations may be made without departure from the scope and spirit of the invention.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head slider comprising:
 a write head having a single magnetic pole, the single magnetic pole having a main magnetic pole piece that extends to a medium opposing surface facing a magnetic disk,
 wherein the main magnetic pole piece generates a recording magnetic field from a medium opposing surface side end face thereof, the medium opposing surface side end face being divided into an injection region and a non-injection region,
 wherein impurities which deteriorate magnetic properties are present in a higher concentration in the injection region relative to a concentration of the impurities in the non-injection region due to injection of the impurities in the injection region,
 wherein the non-injection region has a narrower width at a leading end of the medium opposing surface side end face than at a trailing end of the medium opposing surface side end face.

2. The magnetic head slider according to claim 1, wherein the width at the leading end of the medium opposing surface side end face of the non-injection region is narrower than an average width of the medium opposing surface side end face.

3. The magnetic head slider according to claim 1, wherein an end portion of the non-injection region at the leading end of the medium opposing surface side end face is angular in shape.

4. The magnetic head slider according to claim 1, wherein an end portion of the non-injection region at the leading end of the medium opposing surface side end face is spaced apart from a leading end of the main magnetic pole piece.

5. The magnetic head slider according to claim 4, wherein an injection depth of the impurities to be injected at the injection region into the main magnetic pole piece is less near the leading end portion of the non-injection region than at the leading end of the main magnetic pole piece.

6. The magnetic head slider according to claim 1, wherein a width of the non-injection region at a trailing end is narrower than a width of the medium opposing surface side end face.

7. The magnetic head slider according to claim 1, wherein the main magnetic pole piece further includes:
 a rod-shaped section provided at a tip end with the medium opposing surface side end face which extends to the medium opposing surface; and
 a wide section which connects to a base end of the rod-shaped section and is wider than the rod-shaped section,
 wherein the impurities are injected into a portion of the rod-shaped section.

8. The magnetic head slider according to claim 1, wherein an injection depth of the impurities injected at the injection region into the main magnetic pole piece is less near an interface of the non-injection region and the injection region positioned away from the medium opposing surface than at an inner edge of the non-injection region positioned opposite the interface.

9. The magnetic head slider according to claim 1, wherein the main magnetic pole piece further includes a shield layer inhibiting the passage of the impurities, the shield layer being positioned at a predetermined distance from the medium opposing surface side end face.

10. The magnetic head slider according to claim 1, wherein the injection region and the noninjection region of the main magnetic pole piece each comprise a same material, the non-injection region also including the impurities embedded in the material.

11. The magnetic head slider according to claim 1, wherein an interface between the injection region and the noninjection region of the main magnetic pole piece is defined by an extent of injection of the impurities in the injection region.

12. A magnetic head slider, comprising:
 a write head having a single magnetic pole, the single magnetic pole having a main magnetic pole piece that extends to a medium opposing surface facing a magnetic disk,
 wherein the main magnetic pole piece generates a recording magnetic field from a medium opposing surface side end face thereof, the medium opposing surface side end face being divided into an injection region and a non-injection region,
 wherein impurities which deteriorate magnetic properties are present in a higher concentration in the injection region relative to a concentration of the impurities in the non-injection region due to injection of the impurities in the injection region,
 wherein the non-injection region has a narrower width at a leading end of the medium opposing surface side end face than at a trailing end of the medium opposing surface side end face,
 wherein a concentration of the impurities to be injected at the injection region into the main magnetic pole piece is higher at a portion near the medium opposing surface side end face.

13. A magnetic head slider, comprising:
 a write head having a single magnetic pole, the single magnetic pole having a main magnetic pole piece that extends to a medium opposing surface facing a magnetic disk,
 wherein the main magnetic pole piece generates a recording magnetic field from a medium opposing surface side end face thereof, the medium opposing surface side end face being divided into an injection region and a non-injection region,
 wherein impurities which deteriorate magnetic properties are present in a higher concentration in the injection region relative to a concentration of the impurities in the non-injection region due to injection of the impurities in the injection region,
 wherein the non-injection region has a narrower width at a leading end of the medium opposing surface side end face than at a trailing end of the medium opposing surface side end face,
 wherein an end portion of the non-injection region at a trailing end is divided widthwise into two divisions, and
 wherein the injection region is formed between the two divisions.

14. A magnetic head slider, comprising:
 a write head having a single magnetic pole, the single magnetic pole having a main magnetic pole piece that extends to a medium opposing surface facing a magnetic disk,
 wherein the main magnetic pole piece generates a recording magnetic field from a medium opposing surface side end face thereof, the medium opposing surface side end face being divided into an injection region and a non-injection region,
 wherein impurities which deteriorate magnetic properties are present in a higher concentration in the injection region relative to a concentration of the impurities in the non-injection region due to injection of the impurities in the injection region,
 wherein the non-injection region has a narrower width at a leading end of the medium opposing surface side end face than at a trailing end of the medium opposing surface side end face,
 wherein the main magnetic pole piece further includes a shield layer inhibiting the passage of the impurities, the shield layer being positioned at a predetermined distance from the medium opposing surface side end face,
 wherein the distance between the shield layer and the medium opposing surface side end face decreases with closing to the trailing end of the main magnetic pole piece.

15. A magnetic head slider, comprising:
 a write head having a single magnetic pole, the single magnetic pole having a main magnetic pole piece that extends to a medium opposing surface facing a magnetic disk,
 wherein the main magnetic pole piece generates a recording magnetic field from a medium opposing surface side end face thereof, the medium opposing surface side end face being divided into an injection region and a non-injection region, wherein impurities which deteriorate magnetic properties are present in a higher concentration in the injection region relative to a concentration of the impurities in the non-injection region due to injection of the impurities in the injection region, wherein the non-injection region has a narrower width at a leading end of the medium opposing surface side end face than at a trailing end of the medium opposing surface side end face, wherein the main magnetic pole piece further includes a shield layer inhibiting the passage of the impurities, the shield layer being positioned at a predetermined distance from the medium opposing surface side end face, wherein the main magnetic pole piece further includes:

a first portion which is on a same side as the medium opposing surface side end face with respect to the shield layer; and a second portion which is on a side opposite to the medium opposing surface side end face with respect to the shield layer, wherein the second portion is thicker than the first portion.

16. A system, comprising:

a magnetic recording medium;

at least one magnetic head for reading from and/or writing to the magnetic recording medium;

a magnetic head slider as recited in claim 1 for supporting the magnetic head; and a control unit coupled to the magnetic head for controlling operation of the magnetic head.

* * * * *

UNITED STATES PATENT AND TRADEMARK OFFICE
CERTIFICATE OF CORRECTION

PATENT NO. : 8,270,109 B2
APPLICATION NO. : 12/633588
DATED : September 18, 2012
INVENTOR(S) : Takayoshi Ohtsu It is certified that error appears in the above-identified patent and that said Letters Patent is hereby corrected as shown below:

In the specification:

col. 1, line 40, replace "termed" with --formed--;

col. 5, line 12, replace "firmed" with --formed--;

col. 10, line 1, replace "Ku" with --Ru--.

Signed and Sealed this
First Day of January, 2013

David J. Kappos
*Director of the United States Patent and Trademark Office*